US008711396B2

(12) United States Patent
Tian

(10) Patent No.: US 8,711,396 B2
(45) Date of Patent: Apr. 29, 2014

(54) MANAGING MULTIPLE WEB SERVICES ON A SINGLE DEVICE

(75) Inventor: Lifen Tian, Sunnyvale, CA (US)

(73) Assignee: Ricoh Company, Ltd., Tokyo (JP)

(*) Notice: Subject to any disclaimer, the term of this patent is extended or adjusted under 35 U.S.C. 154(b) by 1130 days.

(21) Appl. No.: 12/334,304

(22) Filed: Dec. 12, 2008

(65) Prior Publication Data

US 2010/0149583 A1 Jun. 17, 2010

(51) Int. Cl.
*G06F 15/00* (2006.01)

(52) U.S. Cl.
USPC ........ 358/1.15; 358/1.14; 358/1.13; 709/227; 709/204

(58) Field of Classification Search
None
See application file for complete search history.

(56) References Cited

U.S. PATENT DOCUMENTS

| | | | | |
|---|---|---|---|---|
| 6,581,098 B1 * | 6/2003 | Kumpf | | 709/227 |
| 7,532,906 B2 * | 5/2009 | Enenkiel | | 455/550.1 |
| 7,701,597 B2 * | 4/2010 | Machiyama | | 358/1.14 |
| 7,954,008 B2 * | 5/2011 | Mahajan et al. | | 714/38.1 |
| 2003/0208533 A1 | 11/2003 | Farquharson et al. | | |
| 2003/0225894 A1 * | 12/2003 | Ito | | 709/227 |
| 2008/0208972 A1 * | 8/2008 | Chou et al. | | 709/204 |

OTHER PUBLICATIONS

Chan, S. et al., "Devices Profile for Web Services" Feb. 2006, 39 pages.

* cited by examiner

*Primary Examiner* — Ashish K Thomas
(74) *Attorney, Agent, or Firm* — Hickman Palermo Truong Becker Bingham Wong LLP; Daniel D. Ledesma

(57) ABSTRACT

Techniques are provided for managing multiple Web services on a single device. The device includes device metadata and a service manager. Each Web service registers with the service manager. Registration includes providing service metadata to the service manager. The service manager may generate (e.g., at least some) service relationship data based on the service metadata. The service relationship data indicates (either explicitly or implicitly) a relationship (e.g., a dependency) between a first Web service of the multiple Web services and a second Web service. In response to one or more criteria being satisfied with respect to the first Web service, the service manager uses the service relationship data and/or the device metadata to determine that one or more actions should be initiated with respective to the second Web service.

20 Claims, 4 Drawing Sheets

MANAGING MULTIPLE WEB SERVICES ON A SINGLE DEVICE

FIELD OF THE INVENTION

The present invention relates to managing multiple Web services on a single device, such as a multi-function peripheral (MFP).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The World Wide Web ("Www") is a global information space. Text documents, images, multimedia and many other items of information, referred to as resources, are identified by short, unique, global identifiers called Uniform Resource Identifiers ("URIs") so that each can be found, accessed and cross-referenced in the simplest possible way.

The World Wide Web Consortium ("W3C") is an international consortium that develops standards for the World Wide Web. The W3C defines a "Web service" as a software system that is designed to support interoperable machine-to-machine interaction over a network. This definition encompasses many different systems, but in common usage, "Web service" refers to those services that use SOAP-formatted Extensible Markup Language ("XML") envelopes and that have their interfaces described using Web Services Description Language ("WSDL"). Web services allow devices and applications to communicate with each other over one or more networks without the intervention of any human being, while using the same suite of protocols (e.g., Hypertext Transfer Protocol ("HTTP")) that a human being would use to communicate with such devices and applications over one or more networks.

The specifications that define Web services are intentionally modular, and, as a result, there is no one document that defines all Web services. Instead, there are a few core specifications that are supplemented by other specifications as the circumstances and choice of technology dictate. Common core specifications are SOAP, WSDL, WS-Security, and WS-ReliableExchange. Different specifications address different tasks and functions.

SOAP is an XML-based, extensible message envelope format, with bindings to underlying protocols (e.g., HTTP and Simple Mail Transfer Protocol ("SMTP")). Using XML, SOAP defines how messages should be formatted, so that those messages are formatted in such a way that the recipients of those messages (devices and applications) can understand those messages. SOAP can be used to perform remote procedure calls, for example.

WSDL is an XML format that allows Web service interfaces to be described along with the details of those interfaces' bindings to specific protocols. WSDL is typically used to generate server and client code, and for configuration.

The Devices Profile for Web Services (DPWS) defines a minimal set of implementation constraints to enable secure Web service messaging, discovery, description, and eventing on devices. The DPWS specification defines an architecture in which devices run two types of services: hosting services and hosted services. Hosting services are directly associated to a device and play an important part in the device discovery process. Hosted services are mostly functional and depend on their hosting device for discovery. DPWS builds on the following core Web services standards: WSDL 1.1, XML Schema, SOAP 1.2, WS-Addressing, and further comprises WS-MetadataExchange, WS-Transfer, WS-Policy, WS-Security, WS-Discovery and WS-Eventing. The latest DPWS specification (published in February, 2006) is incorporated herein by reference as if fully disclosed herein.

MFP

A multi-function peripheral (MFP) is a device that provides multiple Web services, such as a print service, a fax service, a scan service, a copy service, an archive service, and a (Global Positioning System) GPS service. Thus, if an MFP includes a print service, then the MFP includes a printing module that is configured to process print data and cause a printed version of an electronic document reflected in the print data to be printed on a tangible medium, such as paper. The printing module may be implemented as computer hardware, compute software, or any combination of computer hardware and computer software.

Client processes executing on client devices treat MFPs, not as a single device, but simply as a container of multiple Web services. After a client process (referred to hereinafter as a "client") discovers a MFP, the client communicates directly with one or more of the Web services that the MFP provides. The DPWS specification merely defines how, among other things, the presence of Web services on a MFP is shown. However, the DPWS specification does not define how multiple Web services are related, how Web services and/or software components depend on each other, and the relative importance of each of the Web services to the MFP. Due to the lack of clarity in these areas, different clients may interpret device metadata information differently and cause inconsistent user experiences.

SUMMARY

Techniques are provided for accounting for relationships among multiple Web services executing on a printing device. The printing device comprises a first Web service, a second Web service, service metadata, service relationship data, device metadata, and a service manager that is separate from the first and second Web services. The service metadata contains first service metadata for the first Web service and second service metadata for the second Web service. The service relationship data indicates a relationship (e.g., one or more dependencies) between the first Web service and the second Web service for the printing device. The service manager is configured to: (a) register the first Web service on the printing device; (b) register the second Web service on the printing device; and (c) in response to one or more criteria being satisfied: (1) determine, based upon the service relationship data and/or device metadata, that a set of one or more actions are to be performed with respect to the second Web service; and (2) cause the set of one or more actions to be performed with respect to the second Web service.

Techniques are also provided for providing aggregated event or status data to a client. The printing device comprises a first Web service, a second Web service, service metadata, and a service manager. The service metadata contains first service metadata for the first Web service and second service metadata for the second Web service. The service manager is configured to: (a) register the first Web service on the printing device; (b) register the second Web service on the printing device; (c) receive and store on the printing device first status or event data associated with the first Web service; (d) receive and store on the printing device second status or event data associated with the second Web service; (e) provide, to a client, printing device metadata that indicates that the printing device is currently configured to use aggregated data collection; and (f) in response to a request from the client device for status or event data and determining that the printing device is currently configured to use aggregated data collection, provide, to the client, both at least a portion of the first status or event data associated with the first Web service and at least a portion of the second status or event data associated with the second Web service.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for managing multiple Web services on a device, such as a printing device. Each of the multiple Web services register with the device by providing service metadata of the corresponding Web service to a service manager of the device. The service manager (or other device component) generates service relationship data and device metadata based on the received service metadata. The device metadata may include data that does not originate from the service metadata, such as data that is set when the device is configured. The service manager uses the service metadata to determine the relationships among and/or priorities of the multiple Web services. In response to certain conditions or certain criteria being satisfied with respect to a first Web service, the service manager determines, based on device metadata and/or service relationship data, that a second Web service is related to, or dependent on, the first Web service. In response to this determination, the service manager causes one or more actions to be performed with respect to the second Web service, such as sending a termination signal to the second Web service or rebooting the device.

Example System Architecture

Figure 1:
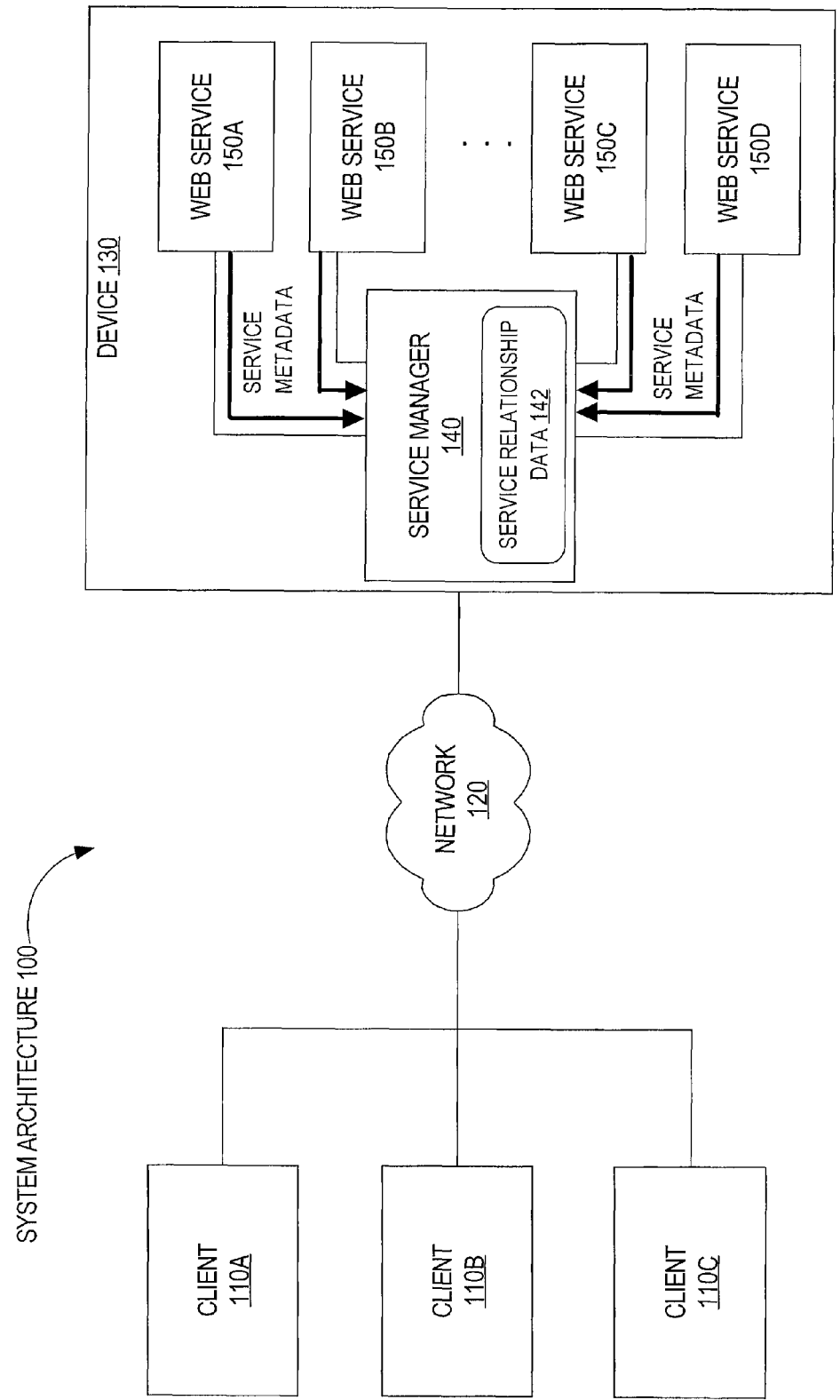
FIG. 1 is a block diagram that depicts an example system architecture comprising multiple clients and a device that provides multiple Web services, according to an embodiment of the invention.

FIG. 1 is a block diagram that depicts an example system architecture 100 for managing multiple Web services on a single device, according to an embodiment of the invention. System architecture 100 comprises clients 110A-C, network 120, and device 130. Device 130 includes a service manager 140 and hosts Web services 150A-D. In a related embodiment, only a single client (e.g., 110A) and a device 130 are communicatively coupled via network 120.

Each of clients 110A-C may be any client that is capable of requesting services from Web services 150A-D. Non-limiting examples of clients 110A-C include personal computers, cell phones, and personal digital assistants (PDAs).

Clients 110A-C are communicatively coupled to device 130 via network 120. Network 120 may be implemented by any medium or mechanism that provides for the exchange of data between clients 110A-C and device 130. Non-limiting examples of network 120 include one or more Local Area Networks (LANs), one or more Wide Area Networks (WANs), the Internet, or any combination thereof.

Device 130 includes a service manager 140. Service manager 140 may be implemented in software, hardware, or any combination of software and hardware. Service manager 140 may comprise one or more modules. Service manager 140 is configured to receive (e.g., during Web service registration) service metadata from Web services 150A-D, as depicted in FIG. 1. Service manager 140 generates or composes service relationship data 142 based on the service metadata.

Service metadata is data that indicates one or more attributes of a service. Device metadata is data that indicates one or more attributes of a device. Service relationship data 142 is data that indicates a relationship between two or more Web services. Service relationship data 142 includes data generated from service metadata. Examples of service metadata, device metadata, and service relationship data are provided below.

Device 130 provides multiple Web services 150A-D. In an embodiment, device 130 is a Web service (WS)-enabled device. A WS-enabled device is a device that implements the Devices Profile for Web Services (DPWS) specification, which was previously incorporated by reference.

For example, Web service 150A may be a printing service, Web service 150B may be a scanning service, Web service 150C may be a faxing service, and Web service 150D may be a document server service. A device may include more or fewer of these Web services and/or different types of Web services, depending upon a particular implementation. Therefore, embodiments of the invention are not limited to this number of, or these types of, Web services.

For purposes of brevity, the following description states that service manager 140 performs a number of actions. However, one or more other processes (not depicted in FIG. 1) may perform those actions, either separately or in combination with service manager 140.

An Illustrative Device

Figure 2:
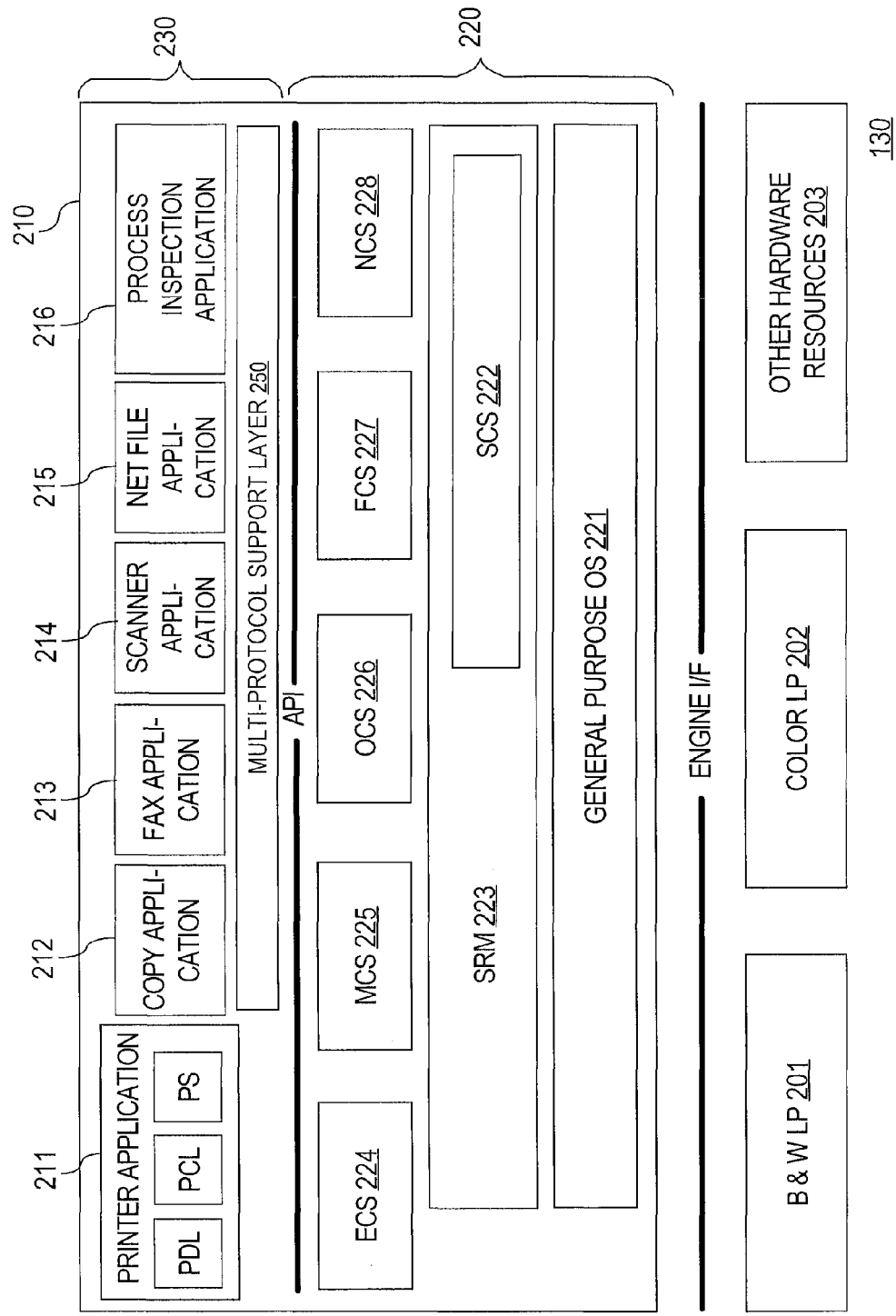
FIG. 2 is an illustrative depiction of an illustrative device according to an embodiment of the invention.

FIG. 2 is an illustrative depiction of an illustrative device 130, in further detail, according to an embodiment of the invention. In the embodiment depicted in FIG. 2, device 130 corresponds to a multi-function peripheral (MFP) that employs the architecture depicted in FIG. 2 (the "GW architecture").

As shown in FIG. 2, device 130 includes a black and white line printer (B&W LP) 201, color line printer (Color LP) 202, and other hardware resources 203. In addition, a software group 210 includes platform 220 and applications 230.

Platform 220 includes control service, system resource manager (SRM) 223, and general purpose OS 221. The control service explained below interprets a processing request issued by applications 230 and generates an acquisition request of hardware resources. System resource manager 223 manages one or more hardware resources and arbitrates between acquisition requests from the control service.

The control service includes a plurality of service modules. In the illustrative example depicted in FIG. 2, the control service includes SCS (system control service) 222, ECS (engine control service) 224, MCS (memory control service) 225, OCS (operation panel control service) 226, FCS (FAX control service) 227, and NCS (network control service) 228. Platform 220 includes an application program interface that allows other processing entities to interact with platform 220.

General purpose OS 221 is a general-purpose operating system, such as UNIX, and executes software programs of platform 220 and applications 230 in parallel respectively as processes. By using open source UNIX, the safety of the programs can be ensured and correspondence to the network becomes possible, and the source code can be obtained easily. In addition, the royalty of the OS and TCP/IP is unnecessary, and out sourcing also becomes easy.

SRM 223 conducts system control and resource management in cooperation with SCS 222. In accordance with a request from a high order layer utilizing hardware resources of an engine such as a scanner portion or a printer portion, a memory, an HDD file, and a host I/O (such as a Centro-I/F, a network I/F, an IEEE 1394 I/F, and an RS 232C I/F), SRM 323 conducts arbitration and execution control.

In the illustrative example depicted in FIG. 2, SRM 223 determines whether requested hardware resources are available (whether the requested hardware resources are not utilized by other requests). If available, SRM 223 notifies a high order layer that the requested hardware resources are available. Further, SRM 223 may conduct utilization scheduling of hardware resources in response to a request from a high order layer, and directly carry out request contents (for example, such as paper conveyance and image formation operation, memory insurance, file generation).

In an embodiment, SCS 222 conducts (1) application management, (2) operation section control, (3) system screen display (such as job list screen and counter display screen), (4) LED display, (5) resource management, and (6) interrupt application control. For example, in the performance of application management, registration of an application and processing of notifying its information to another application may be conducted. As for the application that has been registered, an engine state is notified to the application according to the system setting and request setting from an application. Further, as for applications already registered, an enquiry as to whether system state transition is possible, such as enquiry of power mode shift or an interrupt mode, is conducted.

In an embodiment, in the performance of operation section control, exclusive control of the right of using the operation section of an application is conducted. Moreover, key information from an operation section driver (OCS) is notified exclusively to an application having the right of using the operation section. This key information conducts mask control of temporarily stopping notification according to the state transition of the system such as during application switchover.

Further, in the performance of system screen display, an alarm screen corresponding to the engine state may be displayed according to a request content from an application having the right of using the operation section. Among them, there is one that turns on/off alarm display according to the application state such as a user restriction screen. Other than the engine state, there is conducted display control of a job list screen for displaying a job reservation and execution situation, a counter screen for displaying total counters, and a screen indicating that the CSS is being notified. As for the system screen displays of them, the application is not requested to release the right of using the operation section and drawing is conducted as a system screen covering the application screen.

In an embodiment, in the performance of LED display, display control of a system LED, such as an alarm LED or an application key, is conducted. As for an LED peculiar to an application, the application controls it by directly using a display driver.

In an embodiment, in the performance of resource management, there is conducted service for exclusive control of engine resources (such as a scanner and a staple) that must be excluded when an application (ECS) executes a job. In an embodiment, in the performance of interrupt application control, there are support mechanisms to allow a particular application to operate preferentially.

ECS 224 may control an engine such as the black and white line printer (B&W LP) 201, color line printer (Color LP) 202, and the other hardware resource 203. ECS 224 may conduct image reading, print operation, state notification, jam recovery, and so on.

In the illustrative example depicted in FIG. 2, a series of copy/scan/print operations are implemented by successively issuing print requests to SRM 223 in accordance with job mode specification received from applications 230. Subject jobs handled by the ECS 224 are jobs with a scanner specified as an image input device or jobs with a plotter specified as an image output device.

For example, in the case of copy operation, "SCANNER.fwdarw.PLOTTER-" is specified. In the case of file storage, "SCANNER.fwdarw.MEMORY" is specified. In the case of facsimile transmission, "SCANNER.fwdarw.FAX_IN" is specified. In the case of stored file print or print from printer application 211, "MEMORY.fwdarw.PLOTTER" is specified. In the case of facsimile reception, "FAX_OUT.fwdarw.PLOTTER" is specified.

Although the definition of job differs depending upon application, processing operation for one set of images handled by the user is herein defined as one job. For example, in the case of an ADF (automatic document feeder) mode of copy, operation of reading one set of manuscripts put on a manuscript stand becomes one job. In a pressure plate mode, reading operation conducted as far as the final manuscript is fixed becomes one job. In the case of copy application 212, operation of copying one bundle of manuscripts becomes one job. In the case of fax application 213, transmission operation of one document or reception operation of one document becomes one job. In the case of the printer application, print operation of one document becomes one job.

In the illustrative example depicted in FIG. 2, MCS 225 conducts memory control. MCS 225 may conduct acquisition and release of an image memory, utilization of a hard disk device (HDD), and image data compression and expansion.

As functions required to manage information needed as image data files stored in the hard disk device, there are (1) file access (generation/deletion/open/close) function (including exclusive processing), (2) management of various file attributes (management of image data of physical page units as files) such as file name/ID management (file/user)/password management/storage time management/the number of pages/data format (such as compression system)/access restriction/generating application/print condition management, (3) jointing/insertion/disconnection function by taking a file as the unit and taking a page as the unit, (4) file sort function (in the order of storage time/in the order of user ID or the like), (5) notification of all file information (for display/retrieval), (6) recovery function (file/page discard of a damaged file), and (7) automatic file deletion function.

As functions for retaining image data in a memory such as a RAM and accessing the image data, there are (1) a function of acquiring file and page/band attribute information from the applications 230, and (2) functions of securing, releasing, reading and writing an image data area from the applications 230.

OCS 226 is a module for controlling an operation panel which serves as information transfer means between the operator and main body control. OCS 226 may conduct processing of notifying a key operation event of the operator to the main body control, processing of providing a library function for each application to construct a GUI, processing of managing the constructed GUI information application to application, and display reflection processing onto an operation panel.

In the illustrative example depicted in FIG. 2, OCS 226 has (1) a library providing function for GUI construction, (2) an operation section hardware resource management function, (3) VRAM drawing/LCD display function (hardware display, display application switchover, display language switchover, window dark color display, message/icon blink display, message joint display), (4) hard key input detection function, (5) touch panel key input detection function, (6) LED output function, (7) buzzer output function.

FCS 227 provides an API for conducting facsimile transmission and reception using a PSTN/ISDN network, registration/citation of various facsimile data managed by BKM (backup SRAM), facsimile reading, facsimile reception print, and fused transmission and reception, from each application layer of a system controller.

In the illustrative example depicted in FIG. 2, the FCS 227 has (1) a transmission function of transmitting a document requested to be transmitted by an application layer, to a facsimile receiver by using a PSTN/ISDN network, (2) reception function of transferring and printing a facsimile reception screen and various reports received from the PSTN/ISDN network, (3) telephone directory citation and registration function of conducting citation and/or registration of facsimile management items such as a telephone directory and group information stored in a fax board, (4) a fax log notification function of notifying transmission and reception result history information stored in the BKM mounted on a fax board to an application which needs it, and (5) an event notification function of notifying a changed event to an application registered in the FCS when there has been a state change of the fax board.

NCS 228 is a group of modules for providing applications needing a network I/O with service which can be utilized in common. In an embodiment, the group of modules implements the functionality of service manager 140 and Web services 150A-D. NCS 228 may distribute data received from the network side by using each protocol among applications, and acts as an intermediary when an application transmits data to the network side. To be concrete, the NCS 228 has server demons such as ftpd, httpd, lpd, snmpd, telnetd, and smtpd, and client functions of the same protocol.

Applications 230 include a printer application 211, which is an application for printer having a page description language (PDL), a PCL and a post script (PS), a copy application 212, which is an application for copy, a fax application 213, which is an application for facsimile, a scanner application 214, which is an application for scanner, a net file application 215, which is an application for net file, and a process inspection application 216, which is an application for process inspection. Since each of the applications 211 to 216 can execute operation by utilizing processes on the platform 220, a screen display control program, which conducts screen control, key operation control, and job generation, forms its main constituent. A new application may also be mounted via a network connected by the NCS 228. Applications can be added or deleted application by application.

Multi-protocol support layer 250 may be used to add support, to device 130, for a set of protocols, including a new protocol that device 130 did not previously support. In an embodiment, multi-protocol support layer 250 may include a repository, a protocol manager, listeners, message queues, and protocol handlers. In an embodiment, multi-protocol support layer 250 may perform some of the steps of FIG. 3 discussed in further detail below. While FIG. 2 depicts multi-protocol support layer 250 as part of applications 230, in other embodiments, multi-protocol support layer 250 may be implemented as part of platform 220.

Service Metadata

In an embodiment, when a Web service starts and registers with the device that hosts it, the Web service provides (or exposes) to the device the Web service's metadata. In this manner, the device is not required to assume the Web service's characteristics or attributes.

As defined above, service metadata is data that indicates one or more attributes of a service. The following table is an example of service metadata that a Web service (e.g., Web service 150A) provides to service manager 140.

TABLE 1

| Service Metadata | |
|---|---|
| SERVICE ID | ServiceId1 |
| SERVICE TYPE | WS scanner |
| SERVICE PRIORITY | 1 |
| SERVICE ICON | scanner.jpg |
| SERVICE ENDPOINT | http://123.45.6.789:5678 |
| SERVICE VISIBILITY | External |
| DEPENDED SERVICE | WS eventing service |
| DEPENDED SERVICE | WS addressing service |
| DEPENDED SERVICE | Inter-module communication service |
| . . . | . . . |

In this example, the service metadata provided to service manager 140 indicates (among other things) that the corresponding Web service: (a) has an identifier of "ServiceId1"; (b) is of type "WS scanner" (i.e., a scanner that conforms to the Scan Service Definition specification); and (c) may be accessed directly at endpoint "http://123.45.6.789:5678."

The service metadata of Table 1 also includes a service priority attribute, whose corresponding value indicates a level of importance of the corresponding Web service. For example, service priority "1" indicates a relatively high level of importance, whereas a "10" indicates a relatively low level of importance. Based on the service priority value, service manager 140 may determine which (if any) Web services are critical to device 130's running status. If a particular Web service is critical and service manager 140 determines that the Web service is unavailable, then service manager 140 may take appropriate action, such as sending a termination signal to the remaining Web services and rebooting device 130, even though other (e.g., less important or noncritical) Web services are still available. An "unavailable" Web service is either nonfunctional or unresponsive (e.g., fails to respond to heartbeat messages). For instance, suppose that an MFP hosts multiple Web services, such as printing, scanning, and faxing.

If the printing service or scanning service ceases to work or exits, then service manager 140 causes the MFP to reboot even though the faxing service may still be available.

The service metadata of Table 1 also includes a service visibility attribute, for which the corresponding value indicates whether the corresponding Web service is to be exposed to, or accessible by, clients (e.g., client 110A). In this example, "External" or "Public" indicates that WS scanner should be discoverable by clients (e.g., client 110A). In other words, the service metadata (or at least the service endpoint attribute) of WS scanner should be provided to clients that discover device 130.

The service metadata of Table 1 also includes a depended service attribute, for which the corresponding value indicates a service (or component) upon which WS scanner depends. In this example, WS scanner depends on at least three services: WS-Eventing, WS-Addressing, and an inter-module communication service. Some of the depended services may register with service manager 140 directly and indicate, in their respective service metadata, that they are external/public or internal/private services. For example, WS-Eventing may be a service (on device 130) that is external or public. Thus, when client 110A discovers device 130, device 130 provides the service endpoint of WS-Eventing so that client 110A may access and use WS-Eventing directly. As another example, WS-Addressing may be a service (on device 130) that is internal or private. Thus, when client 110A discovers device 130, device 130 does not explicitly indicate, to client 110A, that WS-Addressing is an available Web service. Thus, with one or more depended service attributes, service manager 140 may determine relationships between the corresponding Web service and other services or components.

The service metadata of Table 1 is not limited to the attributes listed. For example, service metadata may additionally include a brief description that is provided to client 110A when client 110A discovers device 130. In this way, a user of client 110A may analyze the brief description to determine whether the corresponding Web service is a service that the user desires.

Service Relationship Data

As defined above, service relationship data 142 is data that indicates a relationship between one or more services hosted on a device. In an embodiment, service manager 140 generates service relationship data 142 from the service metadata. Specifically, service manager 140 uses the depended service value and/or the service priority values of Web services 150A-D to generate a service importance hierarchy. Services "higher" in the importance hierarchy are relatively more important than services that are "lower" in the hierarchy. Services that have a relatively high service priority and/or services that are depended on by relatively many other services will be higher in the service importance hierarchy relative to other services. Any technique to generate a service importance hierarchy may be implemented.

Service manager 140 may also generate a service dependency tree based on the depended service attribute in the service metadata. In a service dependency tree, the services that most services depend on will be located at the "bottom."

With the service priority and depended service values, service manager 140 has more intelligence to control or manage all Web services 150A-D hosted on device 130. If one basic or critical service at the highest level of the service hierarchy becomes unstable, then service manager 140 may notify all the related or dependent services, and even send them a termination signal to reduce any possible domino effect and, thus, ensure device 130 runs reliably.

Device Metadata

As defined above, device metadata is data that indicates one or more attributes of a device. The following table is an example of device metadata, some of which may be generated by service manager 140. When client 110A discovers device 130, service manager 140 may provide client 110A most (if not all) of the following data.

TABLE 2

| Device Metadata | |
|---|---|
| DEVICE TYPE | WS MFP |
| DEVICE ENDPOINT | http://123.45.6.789:1234 |
| DEVICE ICON | mfp.jpg |
| DEVICE PREFERENCE | WholeDevice |
| DEVICE AGGREGATED EVENT SUPPORT | True |
| DEVICE AGGREGATED STATUS SUPPORT | True |
| HOSTED SERVICE | |
| SERVICE ID | ServiceId1 |
| SERVICE TYPE | WS scanner |
| SERVICE ICON | scanner.jpg |
| SERVICE ENDPOINT | http://123.45.6.789:5678 |
| ... | ... |
| HOSTED SERVICE | |
| SERVICE ID | ServiceId2 |
| SERVICE TYPE | WS printer |
| SERVICE ICON | printer.jpg |
| SERVICE ENDPOINT | http://123.45.6.789:7890 |
| ... | ... |

The service-specific metadata in the device metadata originate from the respective service metadata of the various Web services. Service manager 140 may use the service visibility attribute in the service metadata of each Web service 150A-D to determine which services are to be included in the device metadata, which eventually will be provided to clients. For each service that indicates "External" or "Public", service manager 140 includes at least some of the corresponding service metadata in the device metadata. In this way, any interpretation ambiguity is avoided and user will have consistent device experience across all the clients. Interpretation ambiguity is avoided because the service visibility attribute allows the corresponding service itself to indicate explicitly whether the service wants to be exposed by the device to a client. In this way, the device (e.g., via service manager 140) does not need to guess whether the service should be included in the device metadata. Also, the presence of the service visibility attribute (and other internal service attributes) helps the device compose its device metadata at run time via a configuration file, rather than at design time.

The remaining device metadata (i.e., device type, device endpoint, device icon, and device preference) may be values that were set at the time device 130 was manufactured or at the time the software corresponding to service manager 140 was installed on device 130. Additionally or alternatively, such device metadata values may be set by a user or an administrator of device 130. Alternatively still, some of the device metadata (e.g., device preference) may be "hard coded" into the implementation of service manager 140 or other device-oriented processes. However, with the device metadata separate from the implementation, service manager 140 may be more flexible in being able to consider multiple factors before making a decision that affects one or more Web services.

As indicated above, the device metadata of Table 2 includes a device preference attribute. The corresponding device preference value indicates whether device 130 is to be treated as a single entity (e.g., "WholeDevice" as indicated in Table 2) or as an aggregation of multiple, distinct services. "MultipleServices" is an example of a device preference value that indicates that device 130 is to be treated as an aggregation of multiple, distinct services. If the device preference value indicates that device 130 is to be treated as multiple, distinct services, then, once client 110A discovers Web services 150A-D, client 110A directs requests only to Web services 150A-D. Also, when client 110A installs or uninstalls one of Web services 150A-D, only that Web service is installed or uninstalled.

If the device preference value indicates that device 130 is to be treated as a single entity, then client 110A may direct requests to service manager 140 or some other process that represents device 130. For example, client 110A may request status or event data from service manager 140 instead of requesting such information from Web services 150A-D individually. If device 130 is to be treated as a single entity, then service manager 140 acts to ensure that all Web services 150A-D are available at the same time. If one or more of Web services 150A-D are unavailable, then service manager 140 may take corrective action, which may entail the remaining available Web services becoming unavailable (e.g., through a reboot). Also, when client 110A installs or uninstall any one of Web services 150A-D, the other Web services are installed or uninstalled together.

Using Service Relationship Data and Device Metadata

In an embodiment, service manager 140 uses one or more of device metadata or service relationship data 142 to determine whether to cause one or more actions to be performed relative to one Web service, in response to detecting that one or more criteria have been satisfied relative to another Web service. As indicated above, service relationship data 142 may include a service importance hierarchy and/or a service dependency tree and device metadata includes a device preference value. One or more of these values may be used to determine whether device 130 is to be treated as a single entity. Non-limiting examples of additional data that may be used to make this determination include the device model and current and/or historic usage patterns of the device or hosted Web services.

The following are example scenarios in which service relationship data and/or device metadata is used to determine whether one or more actions should be performed relative to at least one Web service when one or more criteria are satisfied relative to another Web service. In a small office or consumer environment, a relatively low-end MFP model (that includes a printing service and a scanning service) may indicate in its device metadata that the MFP should be treated as a single entity. In other words, the printing and scanning services should be bound together. Thus, if the printing service fails to be installed (e.g., due to the lack of a printer driver), then a client will not install the scanning service. If the scanning service has already been installed when the printing service fails to be installed, then the client should uninstall the scanning service.

In an enterprise environment, a relatively high-end MFP model, which is shared by many users, may indicate in its device metadata that the printing and scanning services are relatively independent. For example, the device preference value may be "MultipleServices." Thus, if clients of the MFP fail to install the printing service, then clients may still continue to install the scanning service so as to minimize the user impact.

In a related scenario, the service relationship data stored in an MFP includes a service importance hierarchy that is generated based on the service priority values associated with each Web service hosted by the MFP. The service importance hierarchy indicates that a print service is the most importance service, followed by a scan service, followed by an archive service, and followed by a fax service. If the fax service fails, then the service manager of the MFP uses this service importance hierarchy to determine that, because the fax service is unimportant relative to the other services hosted on the MFP, the other services will not be affected (e.g., shutdown or taken offline). However, if the print service somehow fails or becomes otherwise unresponsive, then the service manager of the MFP uses the service importance hierarchy to determine that the scan, archive, and fax services are to be (at least temporarily) shutdown (e.g., as part of a restart of the MFP) in order to make the print service available again.

In a related scenario in an enterprise environment, 95% of user requests sent to a relatively high-end MFP model are for the printing service. If the printing service fails, then, although the device model and device preference all indicate that the MFP should be treated as an aggregation of multiple, distinct services, the service manager on the MFP may initiate a reboot of the entire device, which will cause all Web services to become at least temporarily unavailable, even though the other Web services may have been available. Thus, the service manager of the MFP acts to ensure that at least the printing service is available at all times because the predominant use of the MFP is related to the printing service.

Example Actions to be Performed when Two Web Services are Determined to be Sufficiently Related Service manager 140 may cause any number of actions to be performed when it (a) determines that one or more criteria are satisfied relative to a first Web service and (b) determines, based on service relationship data and/or device metadata, a second Web service is sufficiently related to the first Web service.

In an embodiment, service manager 140 may cause device 130 to reboot, as discussed above. Rebooting may involve service manager 140 (or some other process) first sending a termination signal to each available (or all) Web services prior to causing device 130 to reboot. Some example conditions that must be fulfilled to cause a device to reboot are described above, such as one of the Web services becoming unavailable.

In an embodiment, service manager 140 causes one or more Web services to be uninstalled on behalf of a client. Un-installation may be implemented in a variety of ways. In one implementation, un-installation of a Web service triggers the unsubscription of event subscriptions. In another implementation, a client may send, to a device, a message that requests entry removal from the device's contact list. Un-installation of one or more Web services may occur in response to detecting that the client uninstalls any of the other Web services. For example, if service manager 140 receives, from client 110A, unsubscribe messages for Web service 150A, then service manager 140 terminates all the subscriptions of client 110A to the other Web services 150B-D. Thus, service manager 140 effectively uninstalls Web services 150B-D on behalf of client 110A.

In an embodiment, service manager 140 prevents a client from installing one or more Web services. This may occur in response to the client failing to install a first Web service. For example, if client 110A fails to install Web service 150A and (a) the device preference value for device 130 is "WholeDevice" or (b) Web service 150A has a relatively high service priority value, then service manager 140 will prevent other Web services (on device 130), which client 110A has not yet installed, from being installed. Additionally, service manager 140 will cause any Web services (on device 130) that client 110A has installed, prior to client 110A's attempt to install the printing service, to become uninstalled relative to client 110A.

Aggregated Status and Event Data

According to an embodiment of the invention, service manager 140 is configured to function as a central storehouse for event and/or status information. Typically, a client (known as the "consumer") would subscribe for one or more events (or status changes) that occur with respect to a particular Web service (known as the "producer"). When a subscribed event occurs (or the status of the producer changes), the producer sends an event notification to the consumer. One protocol that the client and Web service may implement for event subscription and notification is the WS-Eventing protocol. Embodiments of the invention are not limited to this particular protocol. Alternatively, a client may query a Web service for event and/or status information relating to the Web service.

In an embodiment, instead of contacting each of Web services 150A-D individually for status and/or event information, client 110A contacts service manager 140 for such information. Thus, service manager 140 may also implement WS-Eventing, in which case client 110A may subscribe for an event and service manager 140 would notify client 110A when the event occurs. Client 110A may all pull, from service manager 140, events of interest that have occurred within a certain period. For example, an administrator desires to track whether certain severe conditions have occurred with respect to (e.g., on) device 130 for the past week. Service manager 140 gathers the severe condition information from all Web services 150A-D and sends the data (e.g., in a summarized form) back to client 110A. However, service manager 140 does not necessarily need to be the contact (entry) entity for client 110A. Client 110A may communicate with whatever entity is listening on a device endpoint as specified in device metadata. That entity is not required to be service manager 140.

The following table is an example of status information that service manager 140 maintains and provides to client 110A in response for a request, from client 110A, for aggregated status information.

TABLE 3

| Aggregated Device Status | |
|---|---|
| TIME | 2008-08-03 |
| DEVICE STATUS | Processing |
| SERVICE STATUS INFO | |
| SERVICE ID | ServiceId1 |
| SERVICE STATUS | Processing |
| ... | ... |
| SERVICE STATUS INFO | |
| SERVICE ID | Service Id2 |
| SERVICE STATUS | Idle |
| ... | ... |
| ... | ... |

Client 110A may discover that device 130 supports aggregated device status and aggregated device events via the device metadata (e.g., in Table 2) that is sent to client 110A.

As Table 3 indicates, in addition to Web services 150A-D, a separate status is associated with device 130. If device 130 is to be treated as a single entity and one of the more important Web services is unavailable, then, depending on the implementation of service manager 140, the status of device 130 may indicate that device 130 is non-functional or stopped even though other Web services on device 130 are available. Alternatively, if device 130 is to be treated as an aggregation of multiple, distinct entities and only one Web services is available, then, depending on the implementation of service manager 140, the status of device 130 may indicate that device 130 is available.

Communication Between a Client and a Device

Figure 3:
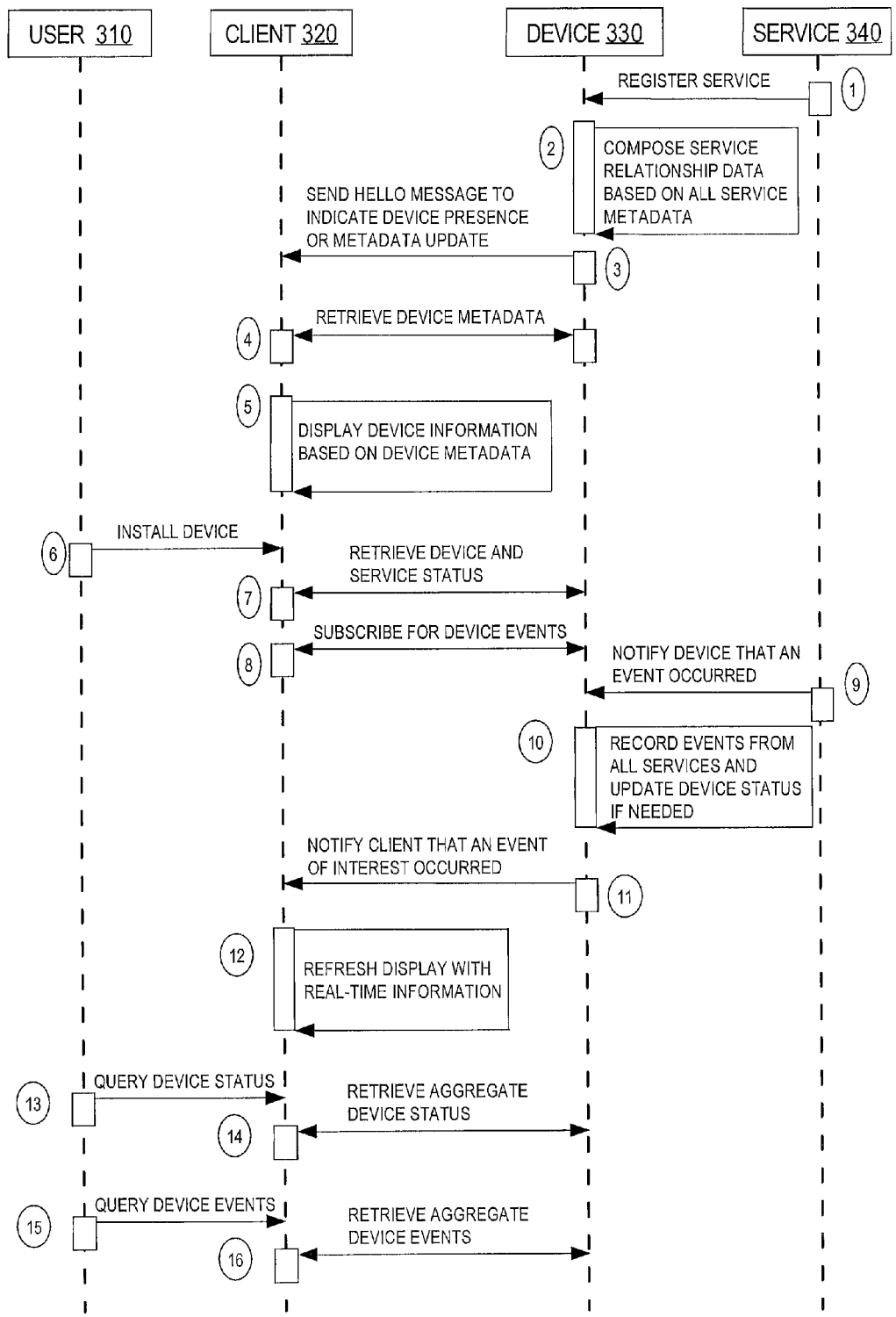
FIG. 3 is a sequence diagram that depicts a set of example communications between a client and a device that provides multiple Web services, according to an embodiment of the invention.

FIG. 3 is a sequence diagram that depicts a set of example communications between a client 320 and a device 330 that provides multiple Web services, according to an embodiment of the invention. FIG. 3 depicts communication between four entities: a user 310, a client 320, a device 330, and a service 340. Client 320 may be one of clients 110A-C in FIG. 1, device 330 represents the whole device, i.e., device 130 in FIG. 1, which includes service manager 140, and service 340 may be one or more of Web services 150A-D in FIG. 1.

At step 1, service 340 registers with device 330. The registration process includes sending service metadata of service 340 to device 330. Alternatively, service 340 may be sending, to device 330, an update of service 340's previously sent service metadata.

At step 2, device 330 generates (or composes) service relationship data, for device 330, based on all service metadata that device 330 receives. If the data in step 1 is an update of existing service metadata, then device 330 updates its device metadata (and possibly service relationship data) accordingly. At step 2, device 330 also generates or updates the service importance hierarchy and/or service dependency tree upon receiving service metadata.

At step 3, device 330 sends a broadcast HELLO message into a network to indicate the device's presence or to indicate that the device metadata has been updated.

At step 4, in response to the HELLO message, client 320 requests and receives device metadata from device 330.

At step 5, client 320 displays, to user 310, device information of device 330 based on the device metadata received in step 4. The device information may include a brief description of one or more of the Web services hosted at device 330.

At step 6, user 310 instructs client 320 to install device 330. User 310 may make this determination based on the device information displayed in step 5.

At step 7, before sending requests to any of the hosted Web services, client 320 requests and receives, from device 330, the current status of device 330 and the hosted Web services (including service 340). Client 320 may use this information to determine whether device 330 and the desired Web services are currently available.

At step 8, client 320 subscribes for device-specific events from device 330. Additionally, the subscription may be for service-specific events. A device-specific event is an event that is associated with the hosting device and not associated with any of the hosted Web services of the hosting device. An example of a device-specific event is the change in status of device 330. A service-specific event is an event that is specific to one of the hosted Web services of the hosting device.

At step 9, service 340 notifies device 330 that a service-specific event occurred.

At step 10, device 330 records and maintains events from all hosted Web services. Device 330 also updates the device status if necessary. For example, if device 330 detects that service 340 is unavailable and device 330 determines that it should be treated as a single entity or that service 340 is a critical service, then device 330 may update its device status from "idle" (i.e., available) to "stopped" even though other hosted Web services on device 330 are available.

At step 11, device 330 notifies client 320 that an event of interest occurred. An event of interest may be an event for which client 320 subscribed in step 8. Additionally or alternatively, an event of interest may be an event for which client 320 did not subscribe. An event may be of such a nature that any client should be notified of the event regardless of whether the client subscribed for the event.

At step 12, client 320 refreshes or updates a display, viewed by user 310, to include information about the event notification received in step 11.

At step 13, user 310 instructs client 320 to query the device status. The query may be to query; (a) the overall status of device 330; (b) the status of each Web service (including service 340) hosted on device 330; or (c) some combination of the above.

At step 14, in response to the query instruction in step 13, client 320 requests and receives the desired status information.

At step 15, user 310 instructs client 320 to query events associated with device 330. The query may be to query the device-specific events of device 330 and/or service-specific events of each Web service (including service 340) hosted on device 330.

At step 16, in response to the query instruction in step 15, client 320 requests and receives the desired event information.

Implementation Mechanisms

Figure 4:
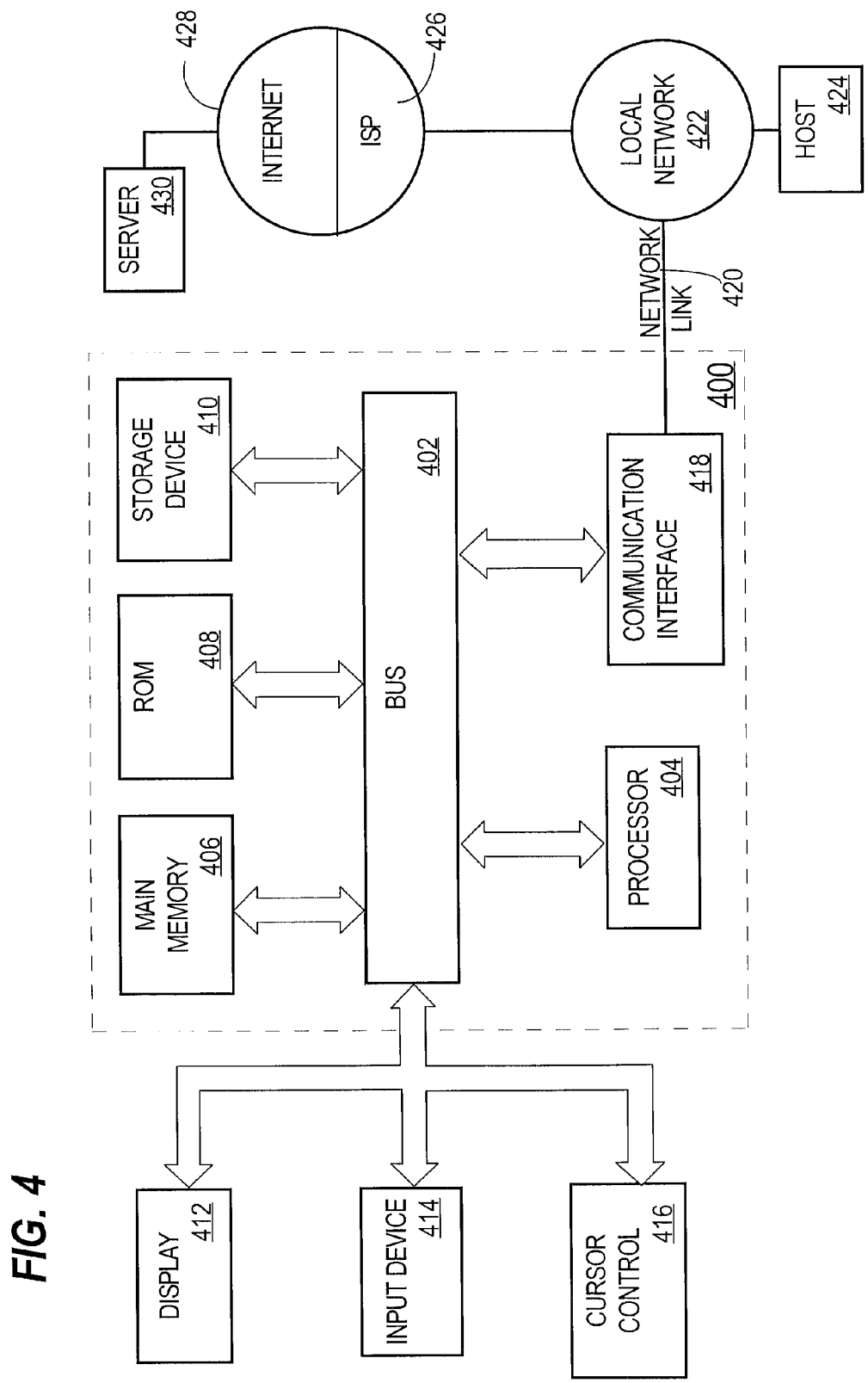
FIG. 4 is a block diagram that depicts a computer system upon which an embodiment of the invention may be implemented.

Embodiments of the invention may be implemented on any type of computing architecture or platform. For purposes of explanation, FIG. 4 is a block diagram that depicts a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
a first Web service that is addressable by one or more clients that are separate from the printing device and that are configured to communicate with the printing device over a network;
a second Web service that is addressable by the one or more clients that are separate from the printing device;
service metadata that contains:
first service metadata for the first Web service, and
second service metadata for the second Web service;
service relationship data that is generated at the printing device based on the first service metadata and the second service metadata and that indicates a relationship between the first Web service and the second Web service for the printing device;
device metadata that contains metadata for the printing device; and a service manager that is configured to:
register the first Web service on the printing device,
register the second Web service on the printing device, and
in response to one or more criteria, associated with the first Web service, being satisfied:
determine, based on one or more of the service relationship data or the device metadata, that a set of one or more actions are to be performed with respect to the second Web service, and
cause the set of one or more actions to be performed with respect to the second Web service.

2. The printing device of claim 1, wherein the first Web service is a printing service and the second Web service is one of a scan service, a facsimile service, an archive service, or a global positioning system (GPS) service.

3. The printing device of claim 1, wherein:
the one or more criteria include the first Web service becoming unavailable; and
the set of one or more actions include at least one of instructing the second Web service to terminate or causing the printing device to reboot.

4. The printing device of claim 1, wherein:
the one or more criteria include a client unsubscribing all events, associated with the first Web service, for which the client subscribed; and
the set of one or more actions include unsubscribing all events, associated with the second Web service, for which the client subscribed.

5. The printing device of claim 1, wherein:
the one or more criteria include a failure of a client installing the first Web service; and
the set of one or more actions include at least one of:
preventing the client from installing the second Web service, causing the client to uninstall the second Web service if the client has installed the second Web service, or unsubscribing all events, associated with the second Web service, for which the client subscribed.

6. The printing device of claim 1, wherein:
the device metadata includes a device preference data that indicates whether the printing device is treated as a single device or as a plurality of services; and
determining that the set of one or more actions are to be performed with respect to the second Web service is based on the device preference data.

7. The printing device of claim 1, wherein:
the first service metadata includes a first service priority data that indicates a level of importance of the first Web service;
the second service metadata includes a second service priority data that indicates a level of importance of the second Web service; and
determining that the set of one or more actions are to be performed with respect to the second Web service is also based on the first service priority data and the second service priority data.

8. The printing device of claim 1, wherein:
the first service metadata includes a first service visibility data that indicates that the first Web service is to be exposed to clients;
the second service metadata includes a second service visibility data that indicates that the second Web service is not to be exposed to clients; and
the service manager is further configured to:
receive, from a client, a request for identification of available services hosted by the printing device; and determine, based on the first service visibility data and the second service visibility data, whether to include, in a response to the request, an identification of the first Web service and the second Web service;
in response to determining that the first service visibility data indicates that the first Web service is to be exposed to clients, including an identification of the first Web service in the response;
in response to determining that the second service visibility data indicates that the second Web service is not to be exposed to clients, not including an identification of the second Web service in the response.

9. The printing device of claim 1, wherein:
the first service metadata includes a first depended service data that indicates one or more first services upon which the first Web service is dependent;
the second service metadata includes a second depended service data that indicates one or more second services upon which the second Web service is dependent; and
the service manager is further to:
in response to determining that a particular service of the one or more first services or the one or more second services is not functioning properly, determine, based on the first depended service data and the second depended service data, which Web services will be affected by the particular service not functioning properly.

10. A printing device comprising:
a first Web service that is addressable by one or more clients that are separate from the printing device and that are configured to communicate with the printing device over a network;
a second Web service that is addressable by the one or more clients that are separate from the printing device;
service metadata that contains:
first service metadata for the first Web service, and
second service metadata for the second Web service; and
a service manager configured to:
register the first Web service on the printing device,
register the second Web service on the printing device,
receive and store on the printing device first status or event data associated with the first Web service,
receive and store on the printing device second status or event data associated with the second Web service,
provide, to a client, printing device metadata that indicates that the printing device is currently configured to use aggregated data collection, and
in response to a request from the client for status or event data and determining that the printing device is currently configured to use aggregated data collection, provide, to the client, both at least a portion of the first status or event data associated with the first Web service and at least a portion of the second status or event data associated with the second Web service.

11. The printing device of claim 10, wherein:
the request is also for a status of the printing device; and
the service manager is further configured to:
maintain a device status data that is separate from status data of the first Web service and status data of the second Web service;
provide the device status data to the client.

12. One or more non-transitory machine-readable media carrying instructions which, when executed by one or more processors, cause:
registering a first Web service, on a printing device, with a service manager of the printing device, wherein registering the first Web service includes the service manager receiving first service metadata of the first Web service;
wherein the first Web service is addressable by one or more clients that are separate from the printing device and that are configured to communicate with the printing device over a network;
registering a second Web service, on the printing device, with the service manager of the printing device, wherein registering the second Web service includes the service manager receiving second service metadata of the second Web service;
wherein the second Web service is addressable by the one or more clients that are separate from the printing device;
maintaining, on the printing device, device metadata that indicates metadata for the printing device;
generating, at the printing device, service relationship data based on the first service metadata and the second service metadata, wherein the service relationship data indicates a relationship between the first Web service and the second Web service; and
in response to one or more criteria, associated with the first Web service, being satisfied:
determining, by the service manager, based on one or more of the service relationship data or the device metadata, that a set of one or more actions are to be performed with respect to the second Web service, and
causing, by the service manager, the set of one or more actions to be performed with respect to the second Web service.

13. The one or more non-transitory machine-readable media of claim 12, wherein the first Web service is a printing service and the second Web service is one of a scan service, a facsimile service, an archive service, or a global positioning system (GPS) service.

14. The one or more non-transitory machine-readable media of claim 12, wherein:
the one or more criteria include the first Web service becoming unavailable; and
the set of one or more actions include at least one of the service manager instructing the second Web service to terminate or causing the printing device to reboot.

15. The one or more non-transitory machine-readable media of claim 12, wherein:
the one or more criteria include a client unsubscribing all events, associated with the first Web service, for which the client subscribed; and
the set of one or more actions include the service manager unsubscribing all events, associated with the second Web service, for which the client subscribed.

16. The one or more non-transitory machine-readable media of claim 12, wherein:
the one or more criteria include a failure of a client installing the first Web service; and
the set of one or more actions include at least one of preventing the client from installing the second Web service, causing the client to uninstall the second Web service if the client has installed the second Web service, or unsubscribing all events, associated with the second Web service, for which the client subscribed.

17. The one or more non-transitory machine-readable media of claim 12, wherein:
the device metadata includes a device preference data that indicates whether the printing device is treated as a single device or as a plurality of services; and determining that the set of one or more actions are to be performed with respect to the second Web service is based on the device preference data.

18. The one or more non-transitory machine-readable media of claim 12, wherein:
the first service metadata includes a first service priority data that indicates a level of importance of the first Web service;
the second service metadata includes a second service priority data that indicates a level of importance of the second Web service; and
determining that the set of one or more actions are to be performed with respect to the second Web service is also based on the first service priority data and the second service priority data.

19. The one or more non-transitory machine-readable media of claim 12, wherein:
the first service metadata includes a first service visibility data that indicates that the first Web service is to be exposed to clients;
the second service metadata includes a second service visibility data that indicates that the second Web service is not to be exposed to clients; and
the instructions include additional instructions which, when executed by the one or more processors, further cause:
the service manager receiving, from a client, a request for identification of available services hosted by the printing device;
the service manager determining, based on the first service visibility data and the second service visibility data, whether to include, in a response to the request, an identification of the first Web service and the second Web service;
in response to determining that the first service visibility data indicates that the first Web service is to be exposed to clients, including an identification of the first Web service in the response;
in response to determining that the second service visibility data indicates that the second Web service is not to be exposed to clients, not including an identification of the second Web service in the response.

20. The one or more non-transitory machine-readable media of claim 12, wherein:
the first service metadata includes a first depended service data that indicates one or more first services upon which the first Web service is dependent;
the second service metadata includes a second depended service data that indicates one or more second services upon which the second Web service is dependent; and
the instructions include additional instructions which, when executed by the one or more processors, further cause:
in response to determining that a particular service of the one or more first services or the one or more second services is not functioning properly, the service manager determining, based on the first depended service data and the second depended service data, which Web services will be affected by the particular service not functioning properly.

\* \* \* \* \*